Dec. 21, 1943.  H. W. ALDEN ET AL  2,337,070
BRAKE MECHANISM
Filed Nov. 14, 1941  2 Sheets-Sheet 2
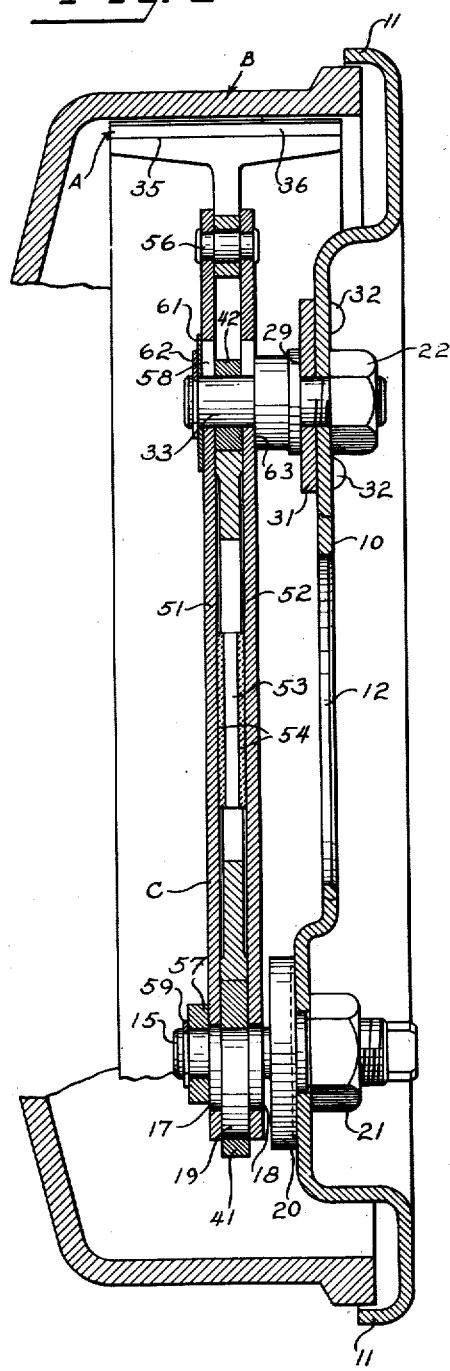
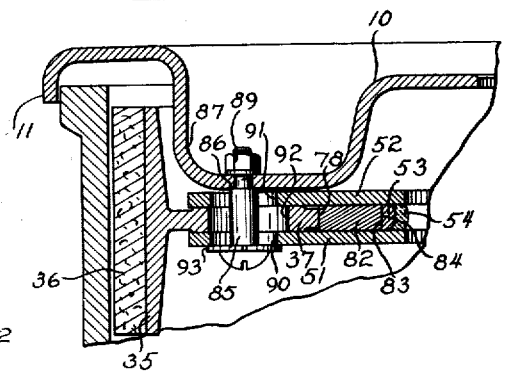
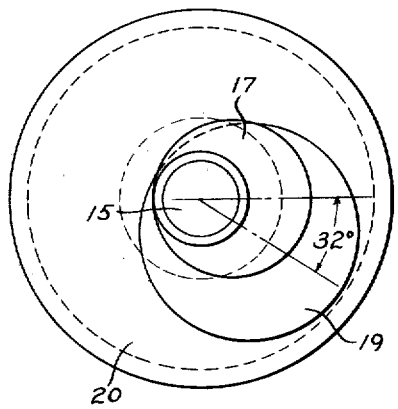
Inventors
Herbert W. Alden
Lawrence R. Buckendale
Ralph K. Super
By Strauch & Hoffman
Attorneys Patented Dec. 21, 1943

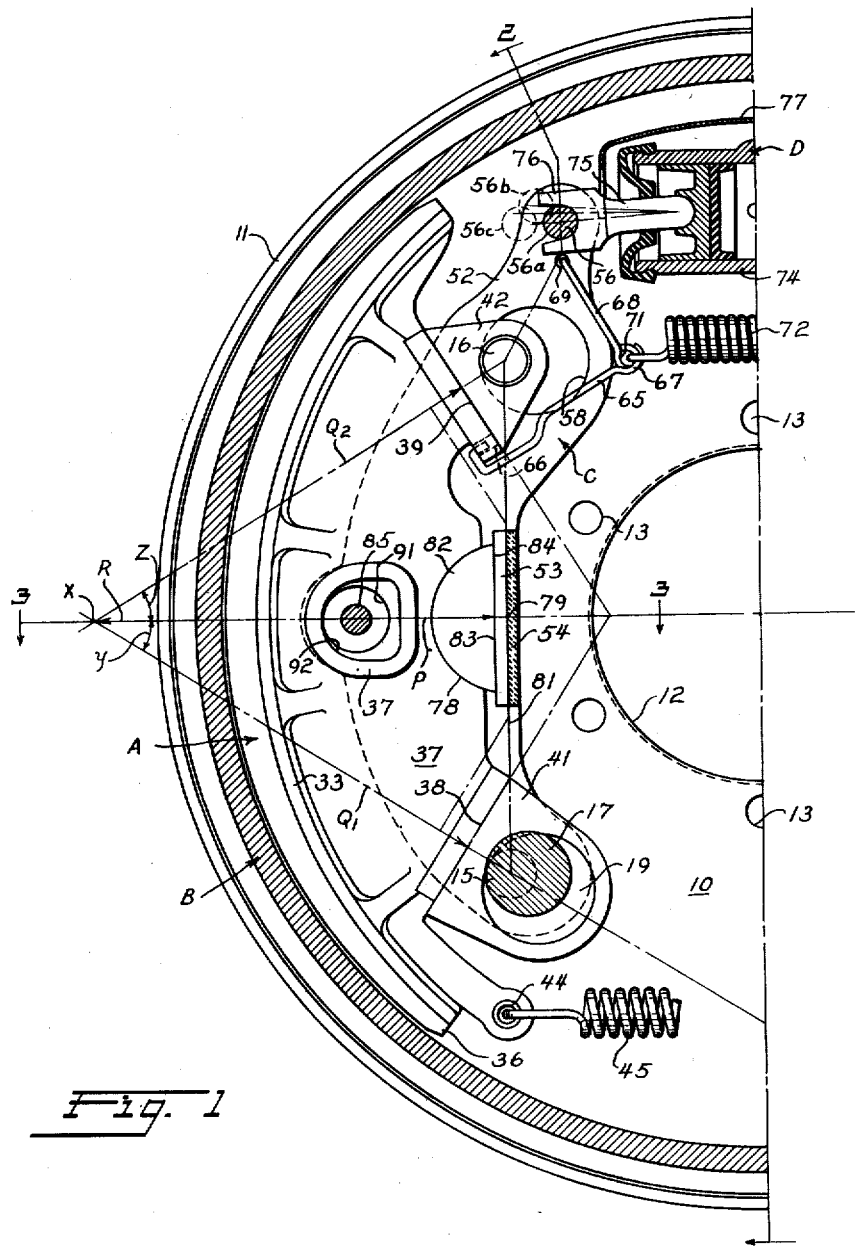

2,337,070

UNITED STATES PATENT OFFICE 2,337,070

BRAKE MECHANISM

Herbert W. Alden, Lawrence R. Buckendale, and Ralph K. Super, Detroit, Mich., assignors to The Timken-Detroit Axle Company, Detroit, Mich., a corporation of Ohio Application November 14, 1941, Serial No. 419,198

17 Claims. (Cl. 188—78)

The present invention relates to brake mechanisms, and more particularly to brake mechanisms for automotive vehicles, although it is not limited to such use.

In the co-pending application of Spiller et al., Serial No. 387,314, filed April 7, 1941, for Brake mechanism, there is disclosed a brake mechanism embodying a pair of floating shoes which coact with fixed abutments in such manner that both shoes function as "leading" shoes in either direction of drum rotation, and each shoe manifests a predetermined degree of self-energization.

While the brake mechanism disclosed in the aforementioned co-pending application constituted a substantial advance in the art, it was found that the shoes did not exert exactly the same braking action in both directions of drum rotation, the forward shoe showing slightly greater wear at the heel.

It is accordingly the major object of this invention to provide a novel brake mechanism which possesses all of the advantages of the brake mechanism of the aforementioned application, overcomes the disadvantages of that brake mechanism, and possesses further important advantages to be hereinafter pointed out.

A further object is to provide a brake mechanism embodying floating shoes whose opposite ends abut link members pivoted upon anchor pins, and to so locate the anchor pins and to give the abutment faces the proper inclination, and to apply forces to the brake shoes in such manner, as to achieve substantially uniform braking characteristics and brake lining wear at both ends of the shoes, in either direction of drum rotation.

Another important object is to provide a brake mechanism having means for adjusting the shoes toward the drum, to compensate for wear of the lining, which is so designed that the center of the shoe is moved approximately twice as far as possible with the brakes heretofore proposed.

A further object is to provide a brake mechanism having a floating shoe actuated by a fulcrumed lever, with means for simultaneously displacing one end of the shoe and the fulcrum point of the lever, in directions to move the shoe toward the drum, for compensating for lining wear.

It is another object to provide an improved device for transmitting forces from the brake actuating lever to the brake shoe, which embodies a large area curved face coacting in rocking surface engagement with the shoe, and a large area flat face coacting in sliding surface engagement with the actuating lever.

A further object is to provide an actuating lever assembly which will exert a compounding or force multiplying action upon the shoe.

Further objects are to provide an improved retracting spring assembly for the lower ends of the shoes, and an improved guiding assembly for the mid-portion of the shoes and levers, to insure lateral stability under all operating conditions, and to generally improve and refine certain other features of the brake mechanism of the aforementioned application, as will hereinafter appear.

Further objects will become apparent as the specification proceeds in conjunction with the annexed drawings and from the appended claims.

In the drawings:

Figure 1 is an end view of a brake mechanism embodying the present invention, only one-half of the brake being shown, to simplify the disclosure, and certain parts being removed, to more clearly illustrate the construction involved;

Figure 2 is a sectional view taken substantially along the line 2—2 of Figure 1, viewed in the direction of the arrows;

Figure 3 is a sectional view taken along the line 3—3 of Figure 1, looking in the direction of the arrows; and Figure 4 is a view of one of the eccentric anchor pins.

With continued reference to the drawings, in which similar reference characters have been employed to designate like parts throughout the several views thereof, the brake mechanism broadly comprises a pair of brake shoes A mounted for movement toward and away from a brake drum B, each brake shoe being actuated by a pair of levers C, which in turn are actuated by any suitable form of mechanism, such as the hydraulic or pneumatic piston and cylinder assembly D or by a cam or the like.

All of the working parts of the brake are carried by a backing or foundation plate 10, which is provided with a peripheral dirt excluding lip 11, and a central opening 12. The foundation plate is adapted to be mounted over an axle in well known manner, with the portion of the plate adjacent opening 12 abutting a flange on the axle, and secured thereto by screws or rivets passing through openings 13 in the plate.

Since the mechanism is exactly symmetrical, and the other brake shoe and lever assemblies are identically the same, only one of them has been shown in order to simplify the disclosure. The novel mounting of the brake shoe will now be described.

Rigidly secured to backing plate 10 is a pair of anchor pins 15 and 16. Pin 15 is provided with a pair of small diameter eccentric portions 17 and 18 and an intermediate large diameter eccentric portion 19. A flange 20 on the pin is pulled into tight engagement with plate 10 by means of a nut 21. Flange 20 may be provided with serrations matching with similar serrations on plate 10 so that when the parts are pulled into tight engagement, the pin is positively locked against rotation. Pin 16 is secured in place by a nut 22.

By mounting the brake shoe abutments and actuating levers upon eccentrics 17, 18 and 19, as hereinafter pointed out, it is possible to simultaneously displace them in novel manner to advance the shoe toward the drum and compensate for brake lining wear. Pin 16 is provided with a squared-end, so that by loosening nut 21 the pin may be engaged by a wrench and turned to rotate the eccentric, and thereby adjust the brake in a manner to be hereinafter pointed out.

Upper pin 16 is provided with a shoulder 29, which is pulled into tight engagement with a reinforcing plate 31, secured in turn to backing plate 10 by means of rivets 32. Pin 16 is provided with a smooth journal portion 33 upon which one of the abutment members is pivoted as will now be described.

Anchor pins 15 and 16 constitute the sole support for the shoe and actuating lever, and by locating the anchor pins in substantial vertical alignment, substantially equally spaced from a horizontal centerline containing the axis of drum rotation, as shown in Figure 1; inclining the abutment faces on the ends of the shoe so as to intersect closely adjacent the horizontal centerline, and applying the braking forces at the mid-portion of the shoe by a device having a rocking axis located closely adjacent the vertical centerline of the anchor pins, as will now be specifically pointed out, a brake mechanism is provided which possesses substantially identical braking characteristics for both directions of drum rotation, and in which both shoes function as leading shoes and manifest a definite controllable degree of self-energization, and the pressure on the shoes is so distributed as to effect equal wear of the lining at both ends of the shoe.

The brake shoes B may be provided with the usual lining material in conventional manner, but they are preferably constructed in accordance with Alden Patent No. 2,167,607 dated July 25, 1939, and have an outer portion 35 which is so shaped that when the lining material 36 is in place, having its outer surface conforming to the shape of the drum, it is of crescent shape in cross-section, with the thickest portion of the lining in the middle of the shoe, where the greatest wear occurs. Therefore, as the lining wears down, even though it wears the greatest degree in the middle of the shoe, at the end of its useful life it will be worn down to all of the rivet heads simultaneously, and maximum use made of the lining material. By reason of the novel adjusting feature of the invention, which provides for a large compensating travel of the shoes, the lining may, if desired, be of three-quarter inch thickness.

The shoe has a central web or flange 37 provided at its opposite ends with abutment faces 38 and 39, which cooperate with link or abutment members 41 and 42, respectively. The abutment members are carried by the anchor pins, and directly absorb the braking torque reaction of the drum in both directions of rotation. Abutment member 41 is pivoted upon eccentric portion 19 of anchor pin 15, so that by rotating the anchor pin, as will be hereinafter described, the abutment member is displaced so as to advance the lower end of the shoe with respect to the drum and take up the clearance caused by lining wear. The upper abutment member 42 is pivoted upon journal portion 33 of anchor pin 16.

The coacting faces of the abutment members are comparatively long, so as to avoid high localized pressures, and to also insure proper pivotal movement of the abutment members in response to the application of the drum reaction forces thereto, and prevent the abutment members from swinging around and locking the shoes in engaged position. The lower end of the brake shoe terminates in an eye 44 into which the end of a tension spring 45 is hooked. The other end of the spring is similarly connected to the other shoe of the brake not shown. It was found possible to employ a single spring 45 to retract the brake shoe, because the downward action of the gravity upon the shoe, in combination with the horizontal pull of spring 45, results in a returning action substantially at right angles to the abutting face.

By locating the anchor pins in vertically spaced relationship as shown, symmetrically disposed at either side of the horizontal centerline axis and employing the force transmitting mechanism between the lever and the shoe which will now be described, and having an effective rocking axis located closely adjacent the anchor pin centers, a brake mechanism is provided having substantially identically the same operating characteristics for both directions of drum rotation, with the wear at one end of the shoe being no greater than the wear at the other, with the result that the lining wears away evenly and a maximum use is made thereof.

A pair of levers 51 and 52, of substantially identical shape, (lever 51 has been removed in Figure 1), are secured together in spaced parallel relationship by means of a block 53, rigidly secured in place between the levers by means of a weld 54, and by a shouldered stud 56 riveted to the upper ends of the levers. Levers 51 and 52 are journalled upon the small diameter eccentric portions 17 and 18, respectively, of anchor pin 15. The lever assembly is detachably secured in place on the lower anchor pin by means of a washer 57 and a split ring 59, which is sprung into a groove in the anchor pin.

By reason of the novel double eccentric construction of anchor pin 15, the latter may be rotated so as to displace both of the rocking axes of member 41 and levers 51 and 52 in a direction to advance the shoe toward the drum and compensate for brake lining wear, in the manner to be hereinafter described in detail.

As seen in Figure 4, the axes of eccentric portions 17 and 18 are coincident with each other but are offset, (preferably by 32°), from the axis of eccentric 19, for the purpose of giving the proper relative adjusting actions of the lever with respect to the shoe, as will hereinafter be pointed out.

Each lever, adjacent its upper end, is provided with an enlarged opening 58 for clearing upper anchor pin 16 in all adjusted positions of the levers. The upper end of the lever assembly is maintained in cooperative relationship with the anchor pin by means of a washer 61 and a snap-ring 62, sprung into a groove in anchor pin 16. The upper end of the lever assembly is accordingly freely rockable in a plane normal to the upper anchor pin, but is stabilized or restrained against movement axially of the pin. As seen in Figure 2, a shoulder 63 on the pin restrains the lever assembly against movement to the right, and the snap-ring assembly just described prevents movement of the lever assembly in the opposite direction.

The upper end of the shoe is urged towards disengaged position by means of a short link member 65 having one end hooked into a bore 66 in the brake shoe web and provided at its free end with an eye 67. A somewhat similar link member 68 is hooked into an opening 69 in the upper end of lever 52 and is provided at its free end with an eye 71. A tension spring 72 is hooked into eyes 67 and 71 at one end, and at the other end is hooked into the corresponding eyes of the opposite brake shoe and link assembly. The spring, acting through the links, constantly urges the brake shoe away from the drum and toward engagement with its abutment link 42. The spring also urges the lever assembly into retracted position, link 68 confining pull of spring 72 upon link 65 to a direction substantially normal to face 39, with the result that there is no tendency to slide the upper end of the shoe across the face of member 42. Opening 69 is located as close to the centerline of pin 56 as practicable, to prevent any tendency for the brake to drag.

The brake shoe actuating levers just described may be operated by hydraulic, pneumatic or mechanical means of any desired character, it only being necessary to spread the upper ends of the levers to actuate the brake. In the present instance, however, we have illustrated a well known type of hydraulic mechanism embodying a cylinder 74 having a piston in each end thereof. A piston rod in the form of a short link 75, seating in a socket in the piston, is provided with a forked portion 76, which fits over, and fulcrums against spacer pin 56. The hydraulic cylinder is also provided with a sheet metal shield 77, which protects the cylinder from the radiant heat of the drum and keeps the fluid below the boiling point. This precludes destruction of the rubber parts in the unit.

When pressure is applied to cylinder 74, links 75 move outwardly and cause the levers to fulcrum about the lower anchor pin eccentric portions as axes. Rocking movement of the levers is transmitted to the brake shoes by a novel fulcrum assembly, which applies the forces substantially centrally of the shoe, permitting free rocking or floating of the shoe into full surface engagement with the drum, and also embodying a force transmitting member having an effective center of rotation located closely adjacent the centerline of the two anchor pins.

The brake shoe web is provided with an accurately formed cylindrical seat 78, whose center of curvature 79 lies substantially on the line 81 joining the centers of the anchor pins. A force transmitting member 82, shaped similarly to a woodruff key, has a curved face accurately fitting recess 78 and a flat face 83 adapted for sliding engagement with an accurately formed flat face 84 provided on block 53. As seen in Figure 3, member 82 is confined between levers 51 and 52, and therefore requires no retaining means to keep it in place.

Member 82 provides a large area curved surface engaging the brake shoe and a large area flat surface engaging member 53, and as the latter is rigidly joined to both levers throughout comparatively long portions, it is apparent that the forces developed in the levers, as a result of actuation of the hydraulic cylinder, are distributed over a large area and uniformly transmitted to members 53. The forces transmitted to the large area bearing surface of member 82 are in turn transmitted through its large area curved surface to the brake shoe, while permitting the shoe to freely align itself with the drum, and at the same time member 82 may freely slide on member 53 to compensate for the offset of the axes of the lever and link 41.

The novel lever and force transmitting assembly just described also possesses the advantage of providing a definite degree of compounding. As seen in Figure 1, the distance from point 79 to the axis of eccentric portions 17 and 18 of anchor pin 15 is less than the distance from point 79 to the axis of pin 56, with the result that the assembly possesses a mechanical advantage and the application of a force of predetermined magnitude upon pin 56 will be reflected as a force of greater magnitude upon the brake shoe. The novel lever assembly will accordingly exert a greater force upon the brake shoe than the assemblies of the prior art, with a cylinder of given size.

If desired, the mid-portions of each shoe may be further stabilized against axial displacement by means of a screw 85, having a shoulder 86, pulled into tight engagement with a pressed in or embossed portion 87 of plate 10, by means of a nut 89. Screw 85 extends through enlarged openings 90 and 91 in levers 51 and 52, respectively, and through a large opening 92 in the brake shoe web, so that the pin will not in any way interfere with movement of the brake shoe or levers. A washer 93 is located under the head of the screw and cooperates with lever 51, it being understood that the parts are so dimensioned that a slight axial play is permitted when the screw is pulled up tight. The embossed portion 87 of plate 10 limits movement of the parts in one direction, and the head of the screw limits movement in the opposite direction.

The brake mechanism embodies a shifting anchor pin for each shoe, with the result that when the brake is actuated with the drum rotating in one direction, the drum reaction is taken by one set of anchor pins, and when the direction of drum rotation is reversed, the drum reaction is taken by the other pair of anchor pins. The brake mechanism of the aforementioned pending application also embodied a shifting anchor pin assembly, but in the present mechanism the parts coact in a somewhat different relationship to modify the action of the mechanism. By locating the anchor pins symmetrically either side of a horizontal line containing the drum axis; applying the lining to the shoes so as to be substantially bisected by the horizontal line; inclining faces 38 and 39 so as to intersect at a point on the horizontal centerline; and applying the braking forces to the shoe by means of a rockable device having an effective axis located closely adjacent the centerline of the anchor pins, the brake mechanism of this invention provides substantially identical operating characteristics in both directions of drum rotation, with both shoes functioning as "leading" shoes in both directions of drum rotation, and achieves controlled degrees of self-energization, and uniform wear of the lining throughout the life of the brake. Also, by providing a novel adjusting mechanism providing simultaneous adjustment of both the shoe and the lever fulcrum, the brake shoe may be adjusted to a materially greater range than the brakes heretofore proposed.

*Operation*

Assuming that the drum is rotating in counterclockwise, (Figure 1) and hydraulic or pneumatic pressure is applied to cylinder 74, link 75 moves outwardly and rocks the lever assembly shown counterclockwise about the axis of eccentric portions 17 and 18 of anchor pin 15. This action, through member 82, forces the brake shoe outwardly toward the drum against the action of springs 45 and 72. As soon as contact of the shoe is made with the drum, the shoe rocks slightly into the proper position to bring it into full surface engagement with the drum, and simultaneously the shoe is displaced a slight distance in a counterclockwise direction to bring its abutment face 38 into firm engagement with link 41, coacting faces 83 and 84 freely sliding upon each other as this takes place. The opposite shoe (not shown) functions in exactly the same way for clockwise rotation of the drum as the illustrated shoe for counterclockwise rotation, since the levers are fulcrumed to the same side of the axis of drum rotation.

Assuming that the drum is rotated in the opposite direction, namely, clockwise as viewed in Figure 1 and the brake actuated as before, the drum reaction forces the brake shoe angularly in a clockwise direction, so as to bring surface 39 into tight engagement with abutment member 42. This transmits the braking reaction forces applied to the shoe to anchor pin 16. The effective anchor for the brake shoe has therefore been shifted or transposed, through reversal of rotation of the drum, from pin 15 to pin 16, and all of the advantages of the leading shoe, which includes a desirable degree of self-energization are realized for both directions of drum rotation.

Upon conclusion of the braking operation, pressure is released from cylinder 74 and springs 44 and 72 return the shoes and levers to inoperative position, spring 72 acting through links 65 and 66 to return the upper ends of the shoe and levers, while spring 45, acting in conjunction with the downward pull of gravity upon the shoe, effects a substantially radial inward return of the lower end of the shoe.

The geometry of this brake is the same as that for the brake of the aforementioned co-pending application. However, in order to show the somewhat different manner in which the forces act upon the parts in the present mechanism, lines have been indicated in Figure 1 as follows. For either direction of drum rotation three forces act upon the shoe, namely, (1) the actuating force P, acting through member 82 substantially at the mid point of the shoe, and directed substantially along the horizontal center line; (2) the thrust or torque reaction Q—1 or Q—2, depending upon the direction of rotations of the drum, and acting at 90° to the particular anchor pin involved; and (3) the resultant drum reaction R, passing through the intersection X of $Q_1$ and $Q_2$.

The force diagram may be solved vectorially in well known manner to locate the point X, it being understood that the distance of point X from the axis of drum rotation will depend upon the co-efficient of the brake lining material employed. The resultant force diagram shows that the brake is perfectly symmetrical, pins 15 and 16 being disposed equal distances on opposite sides of the center line, with the result that angles Y and Z are exactly equal; and $Q_1$ and $Q_2$ are of equal length. It has been found in practice that the brake has identically the same operating characteristics in both directions of drum rotation and that no greater wear is produced on one end of the shoe than the other.

Brake adjustment

If after the brake has been in use for sometime the lining becomes so worn as to introduce an undesirably large clearance between the lining and the drum, each nut 21 is loosened sufficiently to disengage the serrations of flange 20 from the serrations in plate 10, and the anchor pins are rotated to take up the clearance in novel manner, it being understood that the pin 15 shown will be rotated counterclockwise, while the opposite lower pin (not shown) will be rotated clockwise to take up for lining wear.

Referring to Figure 1, the axis of eccentric 19 is offset further from the axis of the anchor pin than eccentric portions 17 and 18, with the result that when the pin is rotated to take up for wear, abutment member 41 and the lever assembly will be simultaneously pulled upwardly and to the left, but member 41 will be moved a greater distance, by reason of the greater offset from the axis. Eccentric portions 17 and 18 are also offset in a counterclockwise direction from portion 19, for a purpose that will presently appear. Moving link member 41 as just described in effect reduces the angular distance between abutment faces 38 and 39, and results in movement of the brake shoe toward the drum, and simultaneously, movement of the lever upwardly and slightly to the left, has the effect of lengthening the mechanical connections from link 75 to the brake shoe, with the result that rotation of the anchor pin as just described results in a compound or a multiplied displacement of the brake shoe in a direction to compensate for brake wear.

It is accordingly apparent that a comparatively small angular movement of the lower anchor pin results in a comparatively large displacement of the brake shoe, as compared with the prior art brakes, in which the thickness of the brake liner is limited to the available stroke in the wheel cylinder, and in which adjustment of one end of the brake shoe results in displacing the center of the shoe only half as far as that achieved in the novel construction just described. This makes it possible to use a thicker lining than has heretofore been feasible.

It is to be observed in Figure 1 that three successive adjusted positions of pin 56 are represented by the illustrations 56ᵃ, 56ᵇ and 56ᶜ, it being understood that the first position corresponds to a "new" lining, the second position corresponds to a partially worn lining, and the third corresponds to a lining which is substantially completely worn out. The second and third positions of the pin are illustrated as the parts appear when the brake is applied. We have found that by initially adjusting anchor pin 15 into the full line position shown in Figure 1, and offsetting eccentric portions 17 and 18 from portion 19 as shown, it is possible to successively adjust it through the life of the brake lining until it has been rotated through almost 180°, without in any way interfering with the proper cooperation of pin 56ᵃ and link 75 with the hydraulic cylinder, since the vertical travel is distributed to either side of the centerline of the hydraulic cylinder. That is, in the first position (56ᵃ), the pin 56 is disposed below the centerline, in the second position (56ᵇ), it is disposed above the centerline a substantially equal distance, and in the third position, (56ᶜ), it is again disposed below the centerline. This precludes rocking of parts into a position that would produce undue angularity of link 75 with respect to the piston.

When the adjusting operation just described has been completed, nuts 21 are then tightened, so as to securely interlock the serrations of anchor pin 15 with foundation plate, and the brake is again ready for service.

Although the novel double eccentric adjustment of the invention has been specifically disclosed as embodied in the particular symmetrical brake illustrated, it is to be understood that the novel brake adjustment is also useful in other types of floating shoe brakes, for instance, it may be advantageously employed in the brake of the aforementioned co-pending application, or other brakes in which the brake shoes are mounted for floating movement alternately into engagement with anchor pin assemblies or the like, located at each end of the brake shoe, and the appended claims are intended to embrace the invention when it is employed in such brakes.

From the foregoing detailed disclosure of the invention it is apparent that we have provided a novel brake mechanism which, by reason of the novel manner of applying the braking forces to the brake shoe; the placement of the anchor pins symmetrically with respect to a horizontal centerline through the drum axis; designing the shoes so as to be substantially bisected by the centerline; the symmetrical inclinations given the abutment spaces of the brake shoe so as to intersect at a point on the horizontal centerline, the brake possesses identical braking characteristics in both directions of drum rotation, and the wear on the lining is absolutely uniform, and also by supporting the lower abutment members and the levers upon a double eccentric anchor pin, it is possible to simultaneously adjust or displace abutment member and the lever fulcrum point in such a manner as to move the brake shoe toward the drum for brake adjusting purposes a materially greater distance than in the brakes of the prior art.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a brake mechanism, a brake drum; means mounting a brake shoe and a brake actuating lever for movement toward and away from said drum about predetermined axes, means for rocking said lever; means for transmitting forces from said lever to said brake shoe when said lever is rocked; and adjusting means for simultaneously displacing said axes in a direction to compensate for wear of said brake shoe, said adjusting means being operable to displace said axes by unequal amounts.

2. In a brake, a drum; a foundation structure associated with said drum; an anchor pin carried by said structure and mounted for rocking movement about its axis into a plurality of adjusted angular positions; an abutment member pivoted on said anchor pin; a brake shoe mounted for movement toward and away from said drum and having an abutment face adapted to apply reactive forces to said anchor pin through said pivoted member when said brake shoe is engaged with said drum; a lever fulcrumed on said anchor pin; means for rocking said lever; means for transmitting forces from said lever to said brake shoe when said lever is rocked; and adjusting means for varying the fulcrum point of said lever to compensate for wear of said brake shoe when said anchor pin is adjusted angularly.

3. The brake defined in claim 2, wherein said adjusting means is also operable to advance said shoe toward the drum when said anchor pin is adjusted angularly.

4. In a brake, a drum; a foundation structure associated with said drum; an anchor pin having an eccentric portion and carried by said structure for adjustment into a plurality of angular positions; a brake shoe mounted for movement toward and away from said drum and adapted to apply reactive forces to said anchor pin when it is engaged with said drum; and a lever fulcrumed on the eccentric portion of said anchor pin and having force transmitting means associated therewith operable to apply braking forces to said brake shoe when said lever is rocked, said eccentric portion of said anchor pin being operable to displace the fulcrum point of said lever to compensate for wear of said brake shoe when said anchor pin is adjusted angularly.

5. In a brake mechanism, a brake drum; a stationary support mounted adjacent said drum; an anchor pin mounted on said support for adjustment into a plurality of angular positions about its axis and having a pair of eccentric portions; a brake shoe mounted for movement toward and away from said drum and adapted to apply reactive forces to one of the eccentric portions of said anchor pin in one direction of drum rotation; a lever fulcrumed upon the other eccentric portion of said anchor pin; means for causing said lever to apply braking forces to said brake shoe when said lever is rocked; and means for angularly adjusting said anchor pin, for simultaneously adjusting said lever and shoe in directions to compensate for wear of said brake shoe.

6. The brake mechanism defined in claim 5, wherein said eccentric portions are disposed different distances from the axis of said anchor pin and are angularly offset with respect to each other.

7. In a brake, a drum; a pair of anchor pins circumferentially spaced with respect to said drum and each pivotally carrying an abutment member; a brake shoe mounted for floating movement toward and away from said drum and having inclined abutment faces adjacent its ends coacting with said abutment members; means for increasing or decreasing the circumferential spacing of said anchor pins, so as to adjust said shoe toward and away from said drum; a lever pivoted adjacent one end of said shoe and operable to engage said shoe with the drum; and means for displacing the pivot point of said lever so as to advance said shoe toward said drum, to take up wear of the shoe.

8. In a brake mechanism, a brake drum; a brake shoe mounted for movement toward and away from said brake drum; a lever fulcrumed adjacent one end of said brake shoe and operable to apply braking forces to the mid-portion of said shoe when it is rocked; actuating means located adjacent the free end of said lever for effecting rocking movement thereof; and adjusting means for displacing the rocking axis of the fulcrumed end of said lever so as to advance said shoe toward the drum, to compensate for brake wear, said adjusting means being operable to advance the free end of said lever first to one side and then the other of the line of action of said actuating means in response to successive brake adjustments.

9. In a brake mechanism, a brake drum; a pair of anchor pins mounted in circumferentially spaced relationship with respect to said brake drum; an abutment member pivoted on each of said pins; a brake shoe mounted for movement toward and away from said drum and having an abutment face adjacent each end adapted to engage said abutment members during brake operation; and lever means for engaging said shoe with said drum; said abutment faces being so inclined that when produced they intersect a radial line at a point between said shoe and the axis of said drum, and said shoe having an effective frictional area which is substantially bi-sected by said radial line, whereby said brake shoe will manifest substantially identical braking and wear characteristics for both directions of drum rotation, said lever means being fulcrumed adjacent one end of said shoe and being operable to apply brake engaging forces to the intermediate portion of said shoe along said radial line.

10. In a brake mechanism, a brake drum; a pair of anchor pins mounted in circumferentially spaced relationship with respect to said brake drum; an abutment member pivoted on each of said pins; a brake shoe mounted for movement toward and away from said drum and having an abutment face adjacent each end adapted to engage said abutment members during brake operation; and means, including a lever, for engaging said shoe with said drum, said means comprising a part having slidable engagement with said lever closely adjacent a plane containing the axes of said anchor pins; said abutment faces being so inclined that when produced they intersect a radial line at a point between said shoe and the axis of said drum, and said shoe having an effective frictional area which is substantially bi-sected by said radial line, whereby said brake shoe will manifest substantially identical braking characteristics for both directions of drum rotation.

11. In a brake mechanism, a brake drum; a pair of circumferentially spaced anchor pins mounted adjacent said drum; a brake shoe mounted for movement toward and away from said drum and having means at the ends thereof adapted to apply reactive forces to said anchor pins during brake application; a lever journalled for rocking movement toward and away from said shoe; and means, having a rocking axis located substantially in a plane containing the axes of said anchor pins, for transmitting braking forces to the mid-portion of said brake shoe when said lever is rocked.

12. In a brake mechanism, a brake drum; a pair of circumferentially spaced anchor pins mounted adjacent said drum; a brake shoe mounted for movement toward and away from said drum and having means at the ends thereof adapted to apply reactive forces to said anchor pins during brake application; a lever journalled for rocking movement toward and away from said shoe; and means, having a rocking axis and a flat force transmitting face located closely adjacent a plane containing the axes of said anchor pins, for transmitting braking forces to the mid-portion of said brake shoe when said lever is rocked.

13. In a brake mechanism, a brake drum and a brake shoe mounted in coacting relationship; an actuating lever pivoted for rocking movement adjacent one end of said shoe; means for rocking said lever; and means for transmitting forces from said lever to said brake shoe, comprising a member having a curved surface seating in a recess in said shoe and having a flat surface slidingly abutting a flat surface provided on said lever.

14. In a brake mechanism, a brake drum and a brake shoe mounted in coacting relationship; an actuating lever pivoted for rocking movement adjacent one end of said shoe; means for rocking said lever; and means for transmitting forces from said lever to said brake shoe, comprising a member having a curved surface seating in a recess in said shoe and having a flat surface slidingly abutting a flat surface provided on said lever, the center of curvature of said curved surface lying closely adjacent the flat surface thereof.

15. In a brake mechanism, a brake drum; a brake shoe mounted for movement toward and away from said drum and having a substantially radially directed web; a lever fulcrumed adjacent one end of said shoe and made up of two parts, one disposed either side of said web; means for securing said lever parts together comprising a member disposed between said parts and presenting a flat face directed toward said web; said web having a curved face disposed opposite said member; and a force transmitting element disposed between said webs and having a curved surface engaging the curved face of said web, and a flat surface disposed in sliding engagement with the flat face of said member.

16. In a brake mechanism, a brake drum; a brake shoe mounted for floating movement toward and away from said drum and adapted to transmit rotative thrusts to a pair of anchor pins carried by a stationary plate; said shoe having a web projecting inwardly between a pair of actuating levers; and means for stabilizing said shoe and levers and limiting axial movement thereof, comprising a shouldered screw carried by said plate and passing through aligned openings in said shoe web and said levers and having a head assembly spaced slightly from the outermost lever so as to provide for free actuation of said shoe and levers, and said opening in said shoe web being of sufficiently large diameter to permit free floating movement of said shoe into thrust transmitting relationship with said anchor pins in either direction of drum rotation.

17. In a brake mechanism, a brake drum; a support mounted in cooperative relationship with said brake drum; a pair of circumferentially spaced anchor pins mounted on said support; an abutment member pivoted on each pin; a brake shoe mounted for floating movement toward and away from said drum and having abutment faces coacting with said pivoted members to anchor the shoe in either direction of drum rotation; a lever fulcrumed on one of said pins and having means for applying brake actuating forces to said shoe intermediate its ends when the lever is rocked; means mounting said one pin for angular adjustment about its axis; and cam means on said one pin for simultaneously adjusting said lever and shoe in directions to compensate for brake shoe wear when said one pin is angularly adjusted.

HERBERT W. ALDEN.
LAWRENCE R. BUCKENDALE.
RALPH K. SUPER.